(12) United States Patent
Rodriguez et al.

(10) Patent No.: US 6,300,265 B1
(45) Date of Patent: Oct. 9, 2001

(54) MOLYBDENUM DISILICIDE COMPOSITES

(75) Inventors: Robert P. Rodriguez, Nambe; John J. Petrovic, Los Alamos, both of NM (US)

(73) Assignee: Regents of the University of California, Los Alamos, NM (US)

(*) Notice: Subject to any disclaimer, the term of this patent is extended or adjusted under 35 U.S.C. 154(b) by 0 days.

(21) Appl. No.: 09/604,700

(22) Filed: Jun. 22, 2000

Related U.S. Application Data

(62) Division of application No. 09/085,367, filed on May 26, 1998, now Pat. No. 6,197,247.
(60) Provisional application No. 60/048,042, filed on May 30, 1997.

(51) Int. Cl.$^7$ .......................... C04B 35/58; C04B 35/599
(52) U.S. Cl. ...................... 501/96.3; 501/98.1; 501/98.2; 501/98.3
(58) Field of Search ................................. 501/96.3, 98.1, 501/98.2, 98.3

(56) References Cited

U.S. PATENT DOCUMENTS

| | | | |
|---|---|---|---|
| 4,814,581 | * 3/1989 | Nunogaki et al. | 219/270 |
| 4,983,554 | 1/1991 | Hsieh | 501/97 |
| 5,063,182 | 11/1991 | Petrovic et al. | 501/96 |
| 5,064,789 | 11/1991 | Petrovic et al. | 501/97 |
| 5,085,804 | 2/1992 | Washburn | 252/516 |
| 5,227,199 | 7/1993 | Hazlebeck et al. | 427/376.2 |
| 5,296,288 | 3/1994 | Kourtides et al. | 428/262 |
| 5,304,778 | 4/1994 | Dasgupta et al. | 219/270 |
| 5,380,179 | 1/1995 | Nishimura et al. | 419/36 |

OTHER PUBLICATIONS

K. H. Jack, "Sialons," *Encyclopedia of Materials Science and Engineering*, vol. 6, pp. 4385–4390, MIT Press, Cambridge, MA, 1986. No month.

K. Yamada and N. Kamiya, "High Temperature Mechanical Properties of $Si_3N_4$–$MoSi_2$ and $Sl_3N_4$–SiC Composites with Network Structures of Second Phases," Proceedings of Engineering Foundation Conference on High Temperature Structural Silicides, May 25–29, 1998, Hyannis, Massachusetts.

Chen–Lung Fan and Mohamed N. Rahaman, "Factors Controlling the Sintering of Ceramic Particulate Composites: I, Conventional Processing," *Journal of the American Ceramics Society*, 75[8](1992) pp. 2056–2065. No month.

L. Mouradoff, A. Lachau–Durand, J. Desmaison, J.C. Labbe, O. Grisot, R. Rezakhanlou, "Study of the Interaction between Liquid Aluminum and Silicon Nitride," *Journal of the European Ceramic Society*, v. 13, (1994) pp. 323–328. No month.

F. Hong and M. H. Lewis, "Ceramic Matrix Composites via In–Situ Reaction Sintering," Ceramic Science and Engineering Proceedings, 14[9/10](1993) pp. 699–706. No month.

E. C. M. Pennings and W. Grellner, "Precise Nondestructive Determination of the Density of Porous Ceramics," *Journal of the American Ceramics Society*, 72[7](1989) pp. 1268–1270. No month.

John J. Petrovic, "High Temperature Structural Silicides," paper presented at 21st Annual Cocoa Beach Conference and Exposition on Composites, Advanced Ceramics, Materials and Structures, Jan. 12–16, 1997.

Lars O. Nordberg and Thommy Edstrom, "Hot–Pressed $MoSi_2$–Particulate–Reinforced Alpha–SiAlON Composites," *Journal of the American Ceramic Society*, 78[3](1995) pp. 797–800. No month.

* cited by examiner

*Primary Examiner*—Karl Group
(74) *Attorney, Agent, or Firm*—Gemma Morrison Bennett

(57) ABSTRACT

Molybdenum disilicide/$\beta'$-$Si_{6-z}Al_zO_zN_{8-z}$, wherein z=a number from greater than 0 to about 5, composites are made by use of in situ reactions among $\alpha$-silicon nitride, molybdenum disilicide, and aluminum. Molybdenum disilicide within a molybdenum disilicide/$\beta'$-$Si_{6-z}Al_zO_zN_{8-z}$ eutectoid matrix is the resulting microstructure when the invention method is employed.

4 Claims, 8 Drawing Sheets

5 μm

MOLYBDENUM DISILICIDE COMPOSITES

This application claims the benefit of U.S. Provisional Application No. 60/048042, filed May 30, 1997, now copending.

This invention was made with government support under Contract No. W-7405-ENG-36 awarded by the U.S. Department of Energy. The government has certain rights in the invention.

TECHNICAL FIELD

This invention relates to structural suicides and more particularly to molybdenum-based suicides and eutectoid composites thereof.

BACKGROUND ART

Structural silicides have important high temperature applications in oxidizing and aggressive environments. There is a continuing and growing need for these materials for applications such as furnace heating elements, molten metal lances, industrial gas burners, aerospace turbine engine components, diesel engine glow plugs and materials for glass processing.

Some of the materials which would theoretically meet some of these needs are difficult to make and/or have deficiencies in engineering properties. For example, conventional β'-SiAlON is produced using silicon, aluminum nitride, and alumina in a nitrogen atmosphere. Due to impurities, β'-SiAlON is normally difficult to produce in a useful structural form according to such sources as the Encyclopedia of Materials Science and Engineering.

Therefore, it is an object of this invention to provide structural suicides with advantageous engineering properties.

It is another object of this invention to provide a method of making structural suicides with advantageous engineering properties.

It is a further object of this invention to provide molybdenum-based silicides.

It is yet another object of this invention to provide a method of making molybdenum-based silicides having improved purity.

It is an object of this invention to provide eutectoid composites of structural silicides having improved purity.

It is another object of this invention to provide a method of making eutectoid composites of structural silicides having improved purity.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. The claims appended hereto are intended to cover all changes and modifications within the spirit and scope thereof.

DISCLOSURE OF INVENTION

To achieve the foregoing and other objects, and in accordance with the purposes of the present invention, as embodied and broadly described herein, there has been invented a composition comprising β'-$Si_{6-z}Al_zO_zN_{8-z}$, wherein z=a number from greater man 0 to about 5, within a molybdenum disilicide matrix.

There has been invented a novel method for making structural disilicides comprising:

(a) combining a major portion of molybdenum disilicide with a minor portion of silicon nitride and a minor portion of aluminum in an inert atmosphere to form a mixture;

(b) forming the mixture into desired shape;

(c) sintering the shape to form a composite of β'-$Si_{6-z}Al_zO_zN_{8-z}$, wherein z=a number from greater than 0 to about 5, in a molybdenum disilicide matrix.

BRIEF DESCRIPTION OF THE DRAWINGS

The accompanying figures, which are incorporated in and form a part of the specification, illustrate embodiments of the present invention and, together with the description, serve to explain the principles of the invention. In the figures:

FIG. 4a is an elemental mapping of Mo $K_\alpha$ and FIG. 4b is an elemental mapping of Al $K_\alpha$.

BEST MODES FOR CARRYING OUT THE INVENTION

Figure 1:
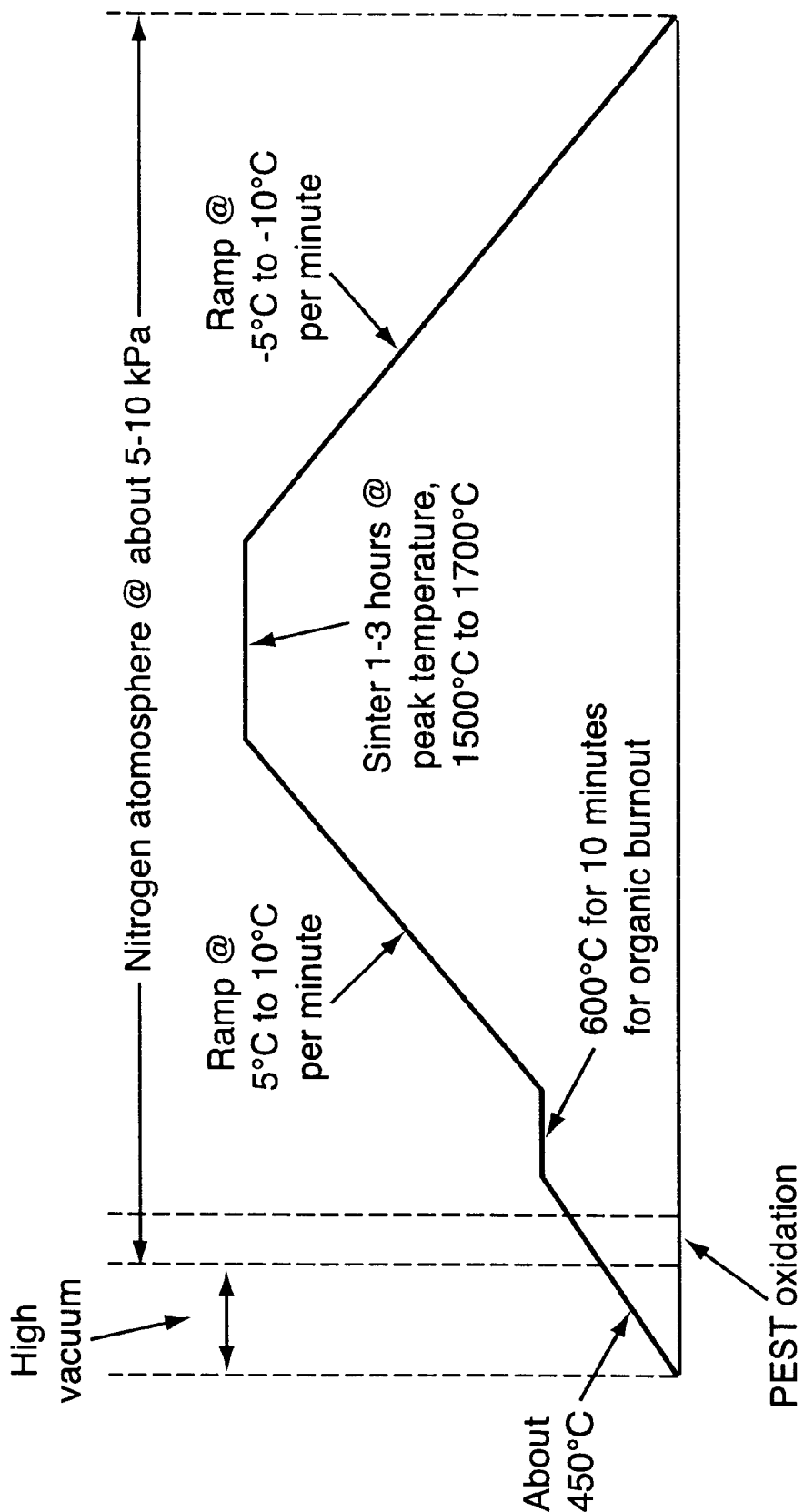
FIG. 1 is a graph of an example of a typical firing and sintering schedule used in the practice of the invention method.

It has been discovered that molybdenum disilicide/β'-$Si_{6-z}Al_zO_zN_{8-z}$, wherein z=a number from greater than 0 to about 5, eutectoid composites can be made by use of in situ reactions among a-silicon nitride, molybdenum disilicide, silicon dioxide, aluminum oxide, and aluminum. β'-$Si_{6-z}Al_zO_zN_{8-z}$, wherein z=a number from greater than 0 to about 5, within a molybdenum disilicide/β'-$Si_{6-z}Al_zO_zN_{8-z}$, eutectoid matrix is the resulting microstructure when the invention method is employed.

The invention method comprises combining a major portion of molybdenum disilicide powder with a minor portion of silicon nitride powder to form a mixture which is then combined with a minor portion of aluminum powder with alumina coating on the aluminum particles. Alternatively, all three components can be combined simultaneously rather than sequentially. The resulting tripartite mixture is dried and de-agglomerated as needed, cold pressed or slip cast, then fired and sintered to form the eutectoid composite of this invention.

In the invention method, both alumina and aluminum nitride are produced in situ in the molybdenum disilicide matrix material followed by an in situ production of β-$Si_{6-z}$ $Al_zO_zN_{8-z}$, wherein z=a number from greater than 0 to about 5, at a temperature above 1400° C. These in situ reactions result in a pure $\beta'$-$Si_{6-z}Al_zO_zN_{8-z}$ within a eutectoid microstructure.

Molybdenum disilicides which are useful in the practice of the invention are those with a high degree of purity, with only very minor amounts of silicon dioxide or having only impurities which would not affect the properties of the sintered product. Generally molybdenum disilicides without any $Mo_5Si_3$ are preferred.

An amount of molybdenum disilicide sufficient to impart thermal conductivity and other desired physical properties is needed; thus an amount of molybdenum disilicide sufficient to form the continuous phase is necessary. An amount in the range from about 55 weight percent to about 95 weight percent, based upon total weight of the matrix and reinforcing material, is generally useful in the invention. More preferable is an amount of molybdenum disilicide in the range from about 65 to about 90 weight percent, based upon total weight of the matrix and reinforcing material. Generally presently most preferred is an amount of molybdenum disilicide in the range from about 75 to about 85 weight percent.

Use of too little molybdenum disilicide will result in failure to form a eutectoid structure and unsintered $Si_3N_4$ in the end product and dissociation of the final product. Use of too much molybdenum disilicide will cause inferior properties in the resulting product.

An amount of silicon nitride sufficient to provide structural integrity to the end product is needed. An amount in the range from about 10 weight percent to about 25 weight percent, based upon total weight of the composition, is generally useful in the invention. More preferable is an amount of silicon nitride in the range from about 15 to about 20 weight percent, based upon total weight of the composition. Generally presently preferred is an amount of silicon nitride in the range from about 16 weight percent to about 18 weight percent, based upon total weight of the composition.

$\beta'$-$Si_{6-z}Al_zO_zN_{8-z}$ will not form if too little silicon nitride is used. Use of too much silicon nitride will cause an insufficiently reinforced eutectoid matrix.

Aluminum which is useful in the practice of the invention is that which is in powder form and which can easily be coated with the alumina. An amount of aluminum sufficient to cause an ion displacement on the $Si_3N4$ structure is needed An amount of aluminum in the range from about greater than 0 to about 15 weight percent, based upon total weight of the composition, is generally useful in the invention. More preferable is an amount of aluminum in the range from about 1 weight percent to about 10 weight percent, based upon total weight of the composition. Generally presently preferred is an amount of aluminum in the range from about 3 weight percent to about 5 weight percent, based upon total weight of the composition Use of too little aluminum would result in less than the desired amount of alumina Use of too much aluminum would likely cause distortion in the product.

Minor amounts of additives can be used as desired for various reasons. Additives can be used for improving the sinterability of the silicon nitride. For example, an additive such as yttrium aluminum garnet will cause a liquid phase to exist when the silicon nitride is just beginning to density, with the liquid phase increasing the speed of the densification so that the silicon nitride densifies at a lower temperature. Use of too much yttrium aluminum garnet as an additive can cause decreases in fracture toughness and strength of the eutectoid composite. If sufficient amounts of the eutectoid are formed, the adverse effects of such additives would be negligible.

The silicon nitride can be combined with the molybdenum disilicide and ball milled prior to addition of the aluminum, or the silicon nitride can be combined with the aluminum and ball milled prior to combining the silicon nitride/ aluminum mixture with the molybdenum disilicide, or the three components can be simultaneously combined and ball milled. It is generally presently preferred to mix the three components simultaneously to reduce risk of contamination.

The combining and subsequent mixing of the components is carried out in an inert atmosphere. Nitrogen gas is the presently preferred atmosphere.

Wet or dry ball milling or mixing by any other convenient means can be used. The mixture of components is ball milled, or otherwise mixed for a time sufficient to produce a uniform mixture of uniformly sized particles. Generally, ball milling the mixture for approximately 6 to 12 hours will accomplish a uniform distribution of particles sizes.

After complete mixing and milling of the three components, the ball-milled mixture can then be dried if needed. The dried cake can be crushed with a mortar and pestle or broken up by any other suitable means as needed to obtain a fine powder for subsequent ball milling with the third component, if the components are added sequentially or for subsequent ball milling with any additives used.

The mixture of ball milled, dried and powdered components can be processed in accordance with green body forming techniques such as slip casting, complex shape forming techniques, or, usually, it is then cold pressed or otherwise processed into pellets or whatever shapes are desired. Slip or compacted molds can be used.

The cold pressed pellets are first heated in a high vacuum and nitrogen atmosphere to decrease the possibility of unwanted oxidation during processing. It is essential that the pellets are first heated to a temperature above 550° C.; generally the maximum temperature should be from about 700° C. to about 800 ° C. At the maximum temperature the mixed, shaped components are divested of any combustible contamination and any interparticle moisture.

With the nitrogen atmosphere continued at positive pressure, the temperature is then held at a temperature in the range from about 500° C. to about 700° C. for long enough to accomplish burning out of all organic materials which may be in the pellets. Generally this will be about 10 minutes or so.

After burnout of the organic material from the pellets, the temperature is ramped up to a temperature of at least 1400° C. over a period of time, generally about two hours or so. Generally, a temperature increase of no more than 5° C. to 20° C. per minute is required because ramping the temperature up too quickly may cause entrapment of evoled gases and or cracking. More rapid ramping up of the temperature is feasible if the components have been dry milled. Ramping the temperature up too slowly could promote undesirable oxidation and would be economically infeasible.

A peak temperature of at least 1400° C. is needed for about 5 hours. Generally, peak temperatures in the range from about 1500° C. to about 1700° C. are preferred. The pellets should be sintered, still in a nitrogen atmosphere, at the peak temperature long enough for sintering of the molybdenum disilicide so that single phase molybdenum disilicide will be in the $MoSi_2$-$Si_{6-z}Al_zO_zN_{8-z}$ eutectoid matrix. Generally this will be a period from about ½ hour to about 5 hours, depending upon nitrogen pressure and sample composition. The larger the amount of silicon nitride, the greater the need for sintering. Lower temperatures may be needed if additives are used. Heating at a high peak temperature for too long a period can cause the materials to settle out, forming a graded or layered composite have a mostly eutectoid bottom layer and mostly molybdenum disilicide top layer. Heating at the peak temperature for too short a period will result in incomplete sintering.

After sintering at the peak temperature for the selected period of time, the temperature is decreased at a rate not to exceed about 15° C. per minute until a cooled temperature is reached.

Table 1 shows results of test runs of comparative compositions (Runs 1–21) and of an invention composition (Run 22) using varying temperatures, atmospheres, and components.

Because the compositions of this invention are sintered without hot pressing, the invention method can be used to create materials of unusual or irregular shapes. The invention method also avoids the economic disadvantages of hot pressing processes.

The composites of this invention have desirable physical properties such as: a melting point above 1800° C., high oxidation resistance, high thermal and electrical conductivity, excellent sinterability, relatively low density, high purity, and very high hardness. The composites of this invention have relatively low coefficients of thermal expansion, and thus have increased resistance to thermal shock. The composites of this invention can be easily machined into desired shapes.

The following examples will demonstrate the operability of the invention.

EXAMPLE I

Operability of the invention method was demonstrated by making a molybdenum disilicide/β-SiAlON, wherein z=a number from greater than 0 to about 5, eutectoid composite from molybdenum disilicide powder and $\alpha$-$Si_3N_4$ powder. The molybdenum disilicide Grade C powder commercially available from H. C. Starck and $\alpha$-$Si_3N_4$ powder commercially available as UBE SN-E-10 was used in each of the samples.

The molybdenum disilicide and $Si_3N_4$ powders were first mixed in volume ratios of 70:30, 80:20, 90:10, and 100:0. Respective weight ratios were 82.2:17.8, 88.8:11.2, 94.7:5.3, and 100:0. To prepare the mixtures, each powder was weighed (±0.01 grams) and then poured into a polyethylene ball mill container.

Two sizes of zirconia ball media were placed about ¼ full. For wet mill mixing efficiency, acetone was added. Each mixture was then ball milled for at least 4 hours.

After ball milling, each mixture was dried at 35° C. for 4 to 6 hours. The dry residue was then scraped and ground in an alumina bowl with an alumina pestle with minimal crushing force. The fine powder was then collected and stored in sealed containers.

To the 80:20 volume mixture of $MoSi_2$/$Si_3N_4$, a 3.8 weight percent aluminum additive was added by the same method as the initial mixture preparation. The resulting composition was 85.4 weight % $MoSi_2$, 10.8 weight % $\alpha$-$Si_3N_4$, and 3.8 weight % fine aluminum. The container was then ball milled for 12 hours.

The powders of each mixture were then cold pressed at about 140 MPa in a stainless steel die. Resulting pellet dimensions were: 1.27 cm (±0.005 cm) outside diameter with thicknesses ranging from 0.17 to 0.22 cm (±0.005 cm). The starting masses ranged from 0.6 to 0.8 grams (±0.001 g).

The cold pressed pellets were then placed within a graphite crucible and covered with another crucible, with sufficient ventilation. The crucibles containing the pellets were then placed in a high temperature Astro vacuum furnace.

Each of the samples was then sintered according to the sintering schedule shown in FIG. 1. The crucibles were heated slowly at a rate of 5 to 10° C. per minute to about 450° C. in a high vacuum. At this temperature the furnace was filled with nitrogen until a slight positive gas flow was achieved (about 5 to 10 kPa). The temperature was increased and held at approximately 550° C. for 10 minutes for organic matter burn-out. The heating rate was then resumed until the sintering temperature was reached. Various ones of the samples were sintered at 1500° C., 1600° C., 1650° C. and 1700° C. using times of 1, 2 and 3 hours. Cooling was done at the same rate as the heating rate.

The $MoSi_2$/β'-SiAlON euctectoid composite sample appeared to sinter in a uniform manner without distortion. Also, there was much less volume shrinkage (68% original volume for this specimen while 53% original volume for a 100% $MoSi_2$ sample-with similar densification at the same time and temperature). Less volume shrinkage without distortion is an important feature because of the consequential lower density, better dimensional tolerance, and less mold fabrication difficulties. The overall density for an 80-20 $MoSi_2$—$Si_3N_4$ volume percent composition was 5.68 g/cm$^3$ compared to an estimated theoretical density of 5.45 g/cm$^3$ for the invention composition.

After sintering, the samples were weighed to determine any losses. The densities were calculated by water submersion methods as described in Pennings and Greliner, "Precise Nondestructive Determination of the Density of Porous Ceramics," *Journal of the American Ceramics Society*, 75[8] (1992)2056–2065. X-ray diffraction analysis and elemental mapping by EDS in SEM were done. Hardness and indentation fracture was determined by the Vickers microhardness indentation test, using a 1 kg load for 25 seconds.

Results of tests of physical properties of the invention eutectoid matrix are shown in Table 1.

TABLE 1

| Properties of the $mOsI_2$/β'-$sI_{6-z}Al_zO_zN_{8-z}$ Eutectoid Matrix | | |
|---|---|---|
| Composition by volume % | 70 % $MoSi_2$ | 30% β'-$sI_{6-z}Al_zO_zN_{8-z}$ |
| Composition by weight % | 82 % $MoSi_2$ | 18% β'-$sI_{6-z}Al_zO_zN_{8-z}$ |
| Theoretical density | 5.16 g/cm$^3$ | |
| Sinterability (at 1700° C. for 3 hours) | >99% dense | |
| Vickers Hardness | 12.9 GPa | |

X-ray diffraction and elemental mapping on polished specimens provided the composition of each sample.

Quantitative microstructural analysis on the phases present was done on a scanning electron micrograph.

Figure 2:
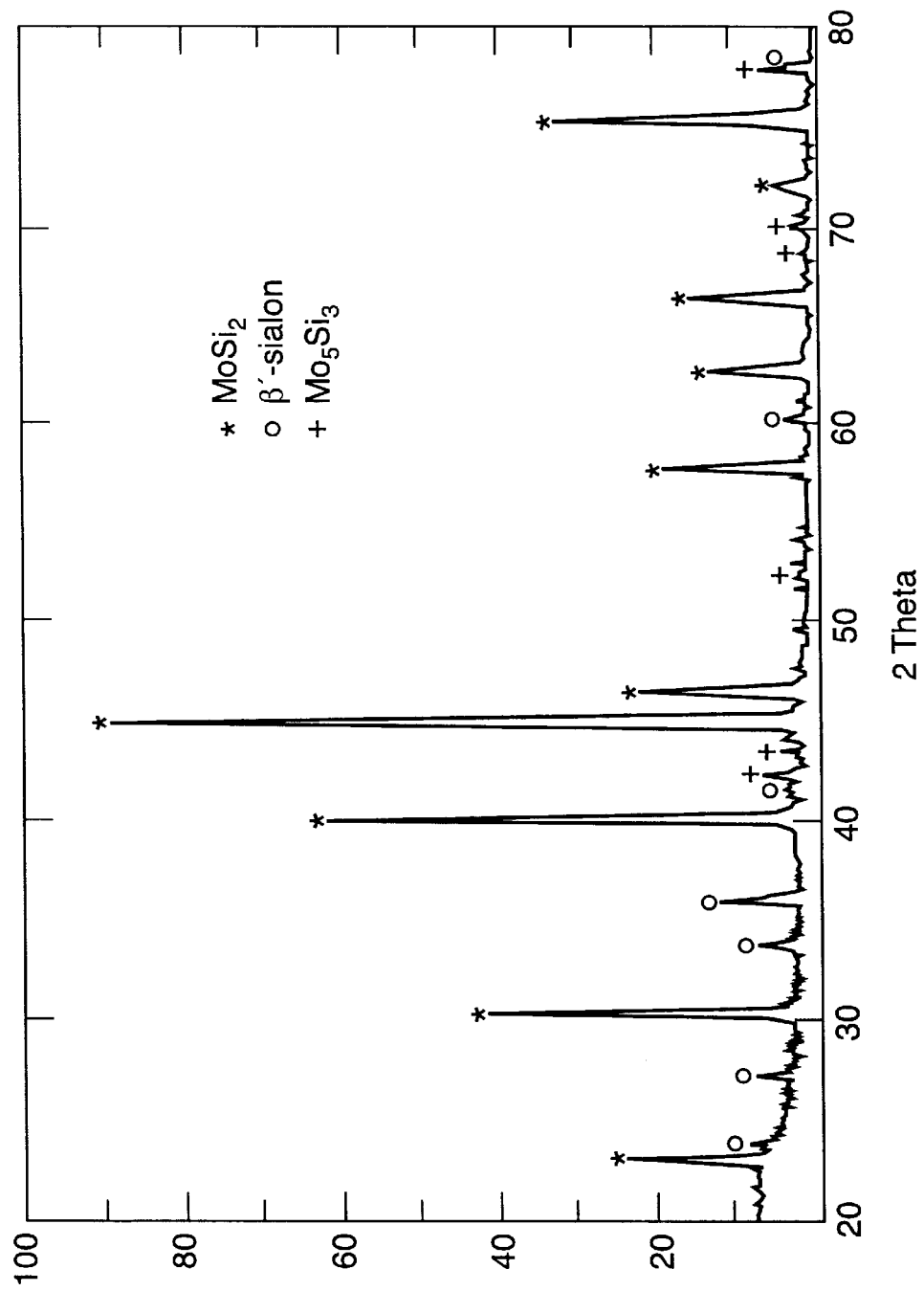
FIG. 2 is an X-ray diffraction pattern of a composite made in accordance with the invention method.

The X-ray diffraction pattern of the composite is shown in FIG. 2. $MoSi_2$, β'-$Si_{6-z}Al_zO_zN_{8-z}$, wherein z=a number from greater than 0 to about 5, and a small amount of $Mo_5Si_3$ was present in each of the samples.

Figure 3:
FIG. 3 is a scanning electron image of the microstructure of an eutectoid matrix region of a composite made in accordance with the invention method.
Figure 4A:
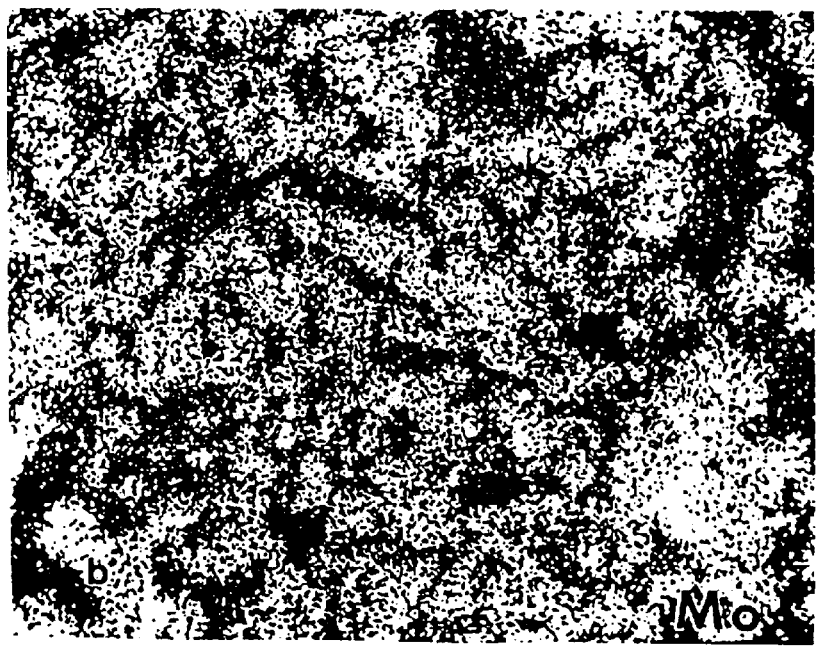
FIGS. 4a and 4b are elemental mappings of the same area of the microstructure of the composite shown in FIG. 3.
Figure 4B:
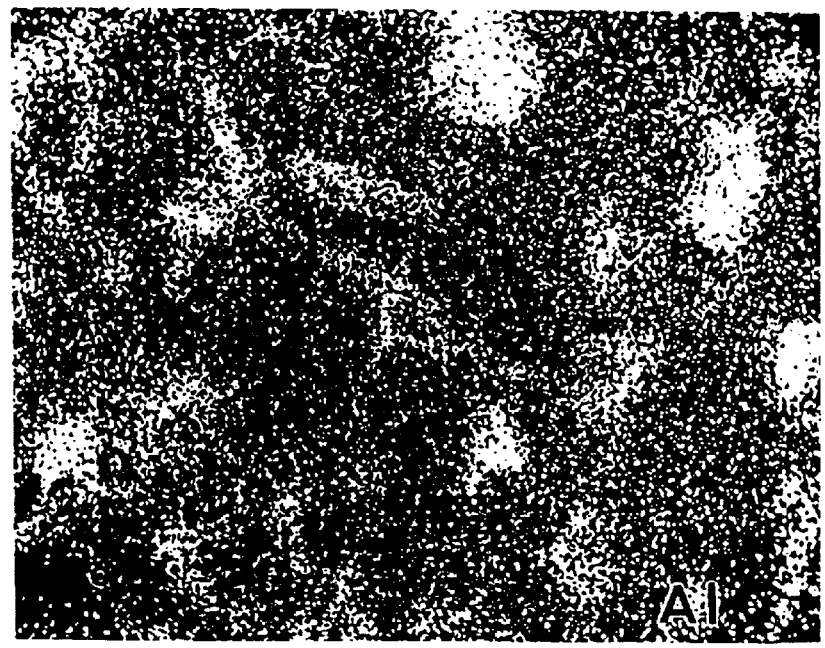

The microstructure of the composite is shown in FIG. 3, while elemental mappings by energy dispersion analysis of Mo $K_\alpha$ and Al $K_\alpha$ are shown in FIGS. 4a and 4b.

Figure 5:
FIG. 5 is scanning electron micrograph image of a eutectoid matrix region of a composite made in accordance with the invention method.
Figure 6:
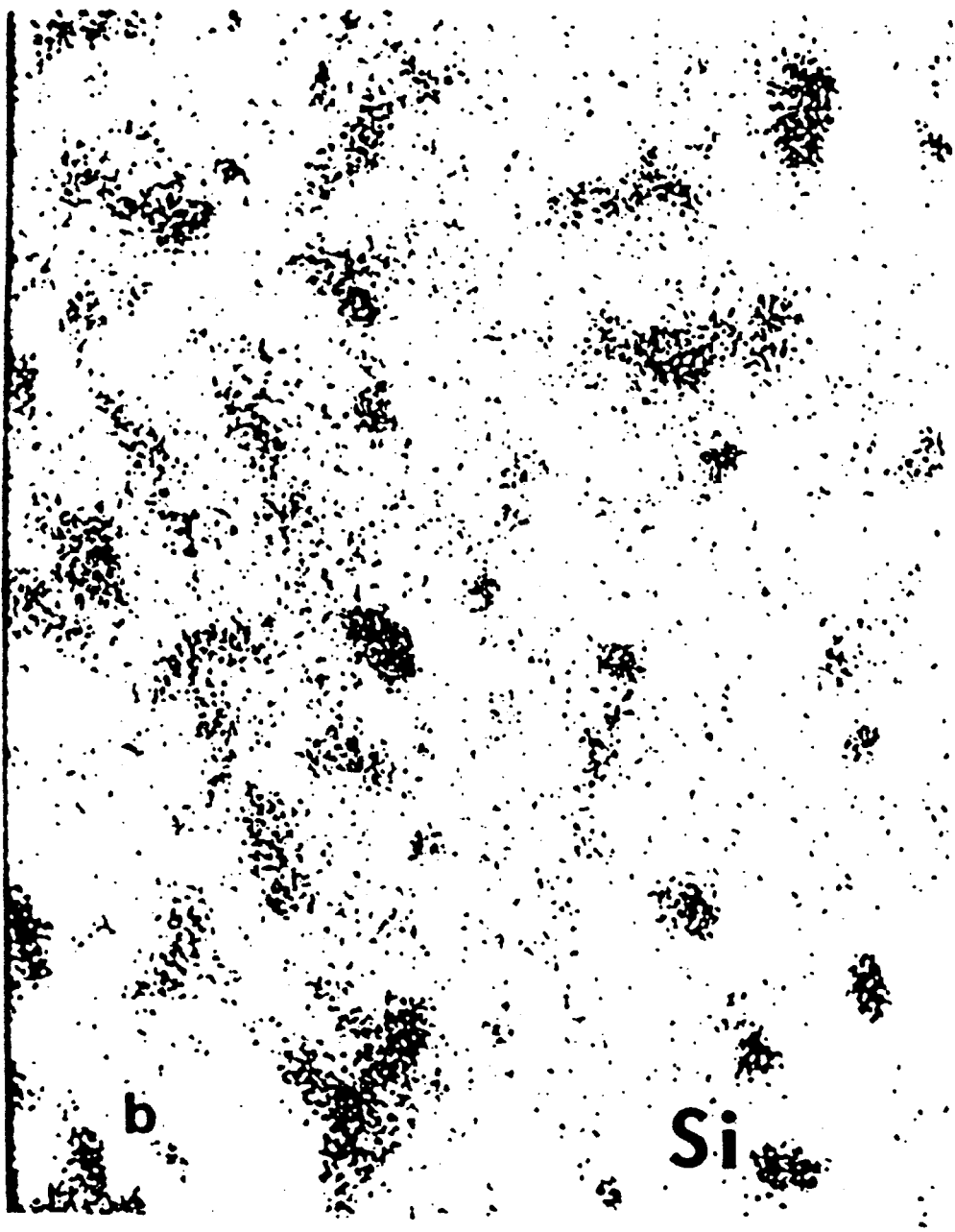
FIG. 6 is a Si $K_\alpha$ mapping of the same area of the eutectoid matrix region of the composite shown in FIG. 5.

FIGS. 5 and 6 show a scanning electron micrograph image of the eutectoid matrix region and the Si $K_\alpha$ mapping of the same area. The presence of silica can be noted throughout the sample.

Figure 7:
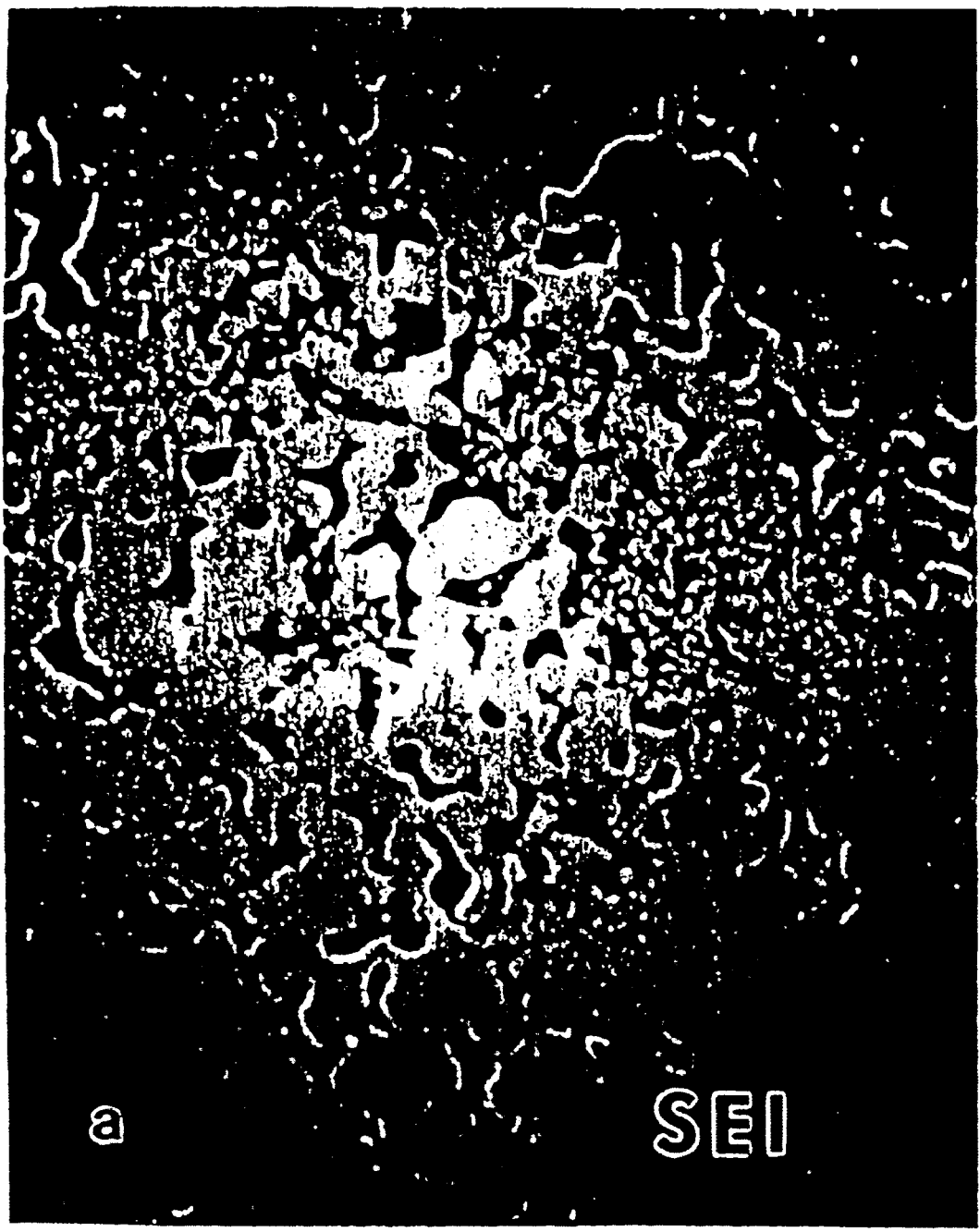
FIG. 7 is a lower magnification scanning electron micrograph image of a eutectoid matrix region made in accordance with the invention method.
Figure 8:
FIG. 8 is a Si $K_\alpha$ mapping of the same area of the eutectoid matrix region of the composite shown in FIG. 7.

FIGS. 7 and 8 show a lower magnification scanning electron micrograph image and the Al $K_\alpha$ mapping. In this image it can be noted that Al is concentrated within a matrix dark phase (indicating $\beta'$-$Si_{6-z}Al_zO_zN_{8-z}$, wherein z=a number from greater than 0 to about 5.

EXAMPLE II

Twenty-two sets of runs were made which show comparison of the inventive composition (Runs 22-1 through 22-5) with other compositions and sintering schedules. These comparison runs and the results are shown in Tables 2 and 3.

TABLE 2

Sintering of $MoSi_2$—$Si_3N_4$

| Run | Composition, (volume %) $MoSi_2/Si_3N_4$ | Temperature, Time, Atmosphere | Sinter bed | Results |
|---|---|---|---|---|
| 1-1 | 100/0 | 1 hr, 3 hr at 1700° C.; 3 hr at 1600° C. Argon | none | 85% dense, grain size increase with $Si_3N_4$ content, green precipitate. |
| 1-2 | 90/10 | | | |
| 1-3 | 80/20 | | | |
| 1-4 | 70/30 | | | |
| 2-1 | 70/30 | 1 hr at 1700° C. Argon | 100% $MoSi_2$ | 90 ± 2% dense with sealed surface cracks. |
| 2-2 | 100/0 | | | |
| 3-1 | 80/20 | 1 hr at 1700° C. Nitrogen | none | 75–85% density, dark color, distorted, ellipsoidal shape, SiC precipitates. |
| 3-2 | 100/0 | | | |
| 4-1 | 80/20 | 1 hr at 1600° C. Nitrogen | 100% $Si_3N_4$ | Non-distorted but unsintered, crack-free surfaces. |
| 4-2 | 100/0 | | | |
| 5-1 | 70/30 | 3 hr at 1700° C. Argon | 100% $Si_3N_4$ | highly sintered, dense, greenish SiC precipitate. |
| 5-2 | 80/20 | | | |
| 5-3 | 100/0 | | | |
| 6-1 | 70/30 | 3 hr at 1700° C. Argon | 100% BN | highly sintered, dense, SiC precipitate. |
| 6-2 | 80/20 | | | |
| 6-3 | 100/0 | | | |
| 7-1 | 80/20 | 3 hr at 1600° C. Nitrogen | 100% BN $Al_2O_3$ plate | sintered, low density, samples appeared darker. |
| 7-2 | 100/0 | | | |
| 8-1 | 80/20 | 3 hr at 1700° C. Nitrogen | 50/50% $MoSi_2/Si_3N_4$ | slightly sintered, low density, SiC precipitate on samples and crucible. |
| 8-2 | 100/0 | | | |
| 8-3 | 70/30 | | | |
| 8-4 | 90/10 | | | |
| 9-1 | 80/20 | 3 hr at 1700° C. Nitrogen | 50/50% $MoSi_2$/BN | sintered, distorted, dark gray color, SiC precipitate. |
| 9-2 | 100/0 | | | |
| 10-1 | 100/0 | 1 hr at 1700° C. Nitrogen | 67/33 BN/$Si_3N_4$ | unsintered, dark gray color, SiC precipitate, 20/80 sample triple size, very unsintered. |
| 10-2 | 90/10 | | | |
| 10-3 | 80/20 | | | |
| 10-4 | 70/30 | | | |
| 10-5 | 50/50 | | | |
| 10-6 | 20/80 | | | |
| 11-1 | 100/0 | 3 hr at 1700° C. Nitrogen | $3SiO_2$ + $Si_3N_4$ in BN | 70/30 sample unsintered; 80/20, 90/10, 100/0 samples partially sintered. |
| 11-2 | 90/10 | | | |
| 11-3 | 80/20 | | | |
| 11-4 | 70/30 | | | |
| 11-5 | 20/80 | | | |
| 12-1 | 100/0 | 3 hr at 1500° C. Nitrogen | $3SiO_2$ + $Si_3N_4$ in BN | all unsintered, SiC precipitate, very light color. |
| 12-2 | 80/20 | | | |
| 12-3 | 70/30 | | | |
| 13-1 | 100/0 | 3 hr at 1600° C. Nitrogen | $SiO_2$ + $Si_3N_4$ in BN | all samples unsintered. |
| 13-2 | 80/20 | | | |
| 14-1 | 100/0 | 3 hr at 1600° C. Nitrogen | $SiO_2$ + $Si_3N_4$ in BN | all unsintered and very low density. |
| 14-2 | 80/20 | | | |
| 14-3 | 80/20 + 1 wt % $SiO_2$ | | | |
| 14-4 | 80/20 + 5 wt % $SiO_2$ | | | |

TABLE 2-continued

Sintering of $MoSi_2$—$Si_3N_4$

| Run | Composition, (volume %) $MoSi_2/Si_3N_4$ | Temperature, Time, Atmosphere | Sinter bed | Results |
|---|---|---|---|---|
| 15-1 | 80/20 | 3 hr at 1600° C. Argon | $MoSi_2$ | all sintered, estimated 85% theoretical density. |
| 15-2 | 80/20 + 5 wt % $SiO_2$ | | | |
| 16-1 | 80/20 | 3 hr at 1600° C. Argon | $SiO_2$ + $Si_3N_4$ in BN | well sintered, extensive cracking. |
| 16-2 | 80/20 + 5 wt % $SiO_2$ | | | |
| 17-1 | 80/20 | 3 hr at 1600° C. Argon | none | well sintered. |
| 17-2 | 80/20 + 5 wt % $SiO_2$ | | | |
| 18-1 | 100/0 | 3 hr at 1700° C. Nitrogen | $\alpha$-$Si_3N_4$ | all samples except 100/0 failed to sinter; possible error in atmosphere control. |
| 18-2 | 80/20 | | | |
| 18-3 | 80/20 + 4 wt % $Al_2O_3$ | | | |
| 18-4 | 80/20 + 4 wt % Al | | | |
| 19-1 | 100/0 | 3 hr at 1600° C. Argon | none | all samples well sintered, 19-3 sample sintered but had cold press cracks. |
| 19-2 | 80/20 | | | |
| 19-3 | 80/20 + 4 wt % $Al_2O_3$ | | | |
| 19-4 | 80/20 + 2 wt % C | | | |
| 19-5 | 100/0 + 2 wt % C | | | |
| 20-1 | 100/0 | 3 hr at 1600° C. Argon | 70/30 Wt % $MoSi_2$/SiC | all samples well sintered, 80/20 + 2C sample sintered but had cold press cracks. |
| 20-2 | 80/20 | | | |
| 20-3 | 80/20 + 2 wt % C | | | |
| 20-4 | 100/0 + 2 wt % C | | | |
| 20-5 | 80/20 + 4 wt % $Al_2O_3$ | | | |
| 21-1 | 100/0 | 3 hr at 1700° C. Nitrogen | 70/30 wt % $MoSi_2$/SiC | all sintered well; 21-4 had many crack along grains; 21-5 split it in two by cracking. |
| 21-2 | 80/20 | | | |
| 21-3 | 80/20 + 2 wt % C | | | |
| 21-4 | 80/20 + 4 wt % $Al_2O_3$ | | | |
| 21-5 | 80/20 + 4 wt % Al | | | |
| 22-1 | 100/0 | 3 hr at 1700° C. Nitrogen | 100% $\alpha$-$Si_3N_4$ | 100/0, 80/20, 80/20 + 4Al all sintered well; 80-20 distorted; 80/20 + Al extremely brittle; 80/20 + C cracked due to distortion. |
| 22-2 | 80/20 | | | |
| 22-3 | 80/20 + 2 wt % C | | | |
| 22-4 | 80/20 + 4 wt % $Al_2O_3$ | | | |
| 22-5 | 80/20 + 4 wt % Al | | | |

TABLE 3

Sintering of $MoSi_2$—$Si_3N_4$

| Run | $MoSi_2/Si_3N_4$ (vol %); Weight Loss or Gain (wt %) | X-ray Diffraction Analysis | Comments |
|---|---|---|---|
| 1-1 | 100/10; none | 1-2, 1-3, 1-4: no $Si_3N_4$, all | Silicon nitride decomposition |
| 1-2 | 90/10; 2.5–3% loss | | |

TABLE 3-continued

Sintering of $MoSi_2$—$Si_3N_4$

| Run | $MoSi_2/Si_3N_4$ (vol %); Weight Loss or Gain (wt %) | X-ray Diffraction Analysis | Comments |
|---|---|---|---|
| 1-3 | 80/20; 10–11% loss | $MoSi_2$; | occurring, SiO gas likely to react w/graphite crucible producing SiC precipitate. |
| 1-4 | 70/30; 16–18% loss | SiC precipitate | |
| 2-1 | 100/0; none | 2-1, 2-2: no $Si_3N_4$, all $MoSi_2$; SiC precipitate | Silicon nitride decomposition occurring, SiO gas likely to react w/graphite crucible producing SiC precipitate; embedding powder improved quality of sintered product. |
| 2-2 | 70/30; 15% loss | | |
| 3-1 | 100/0; 7% loss | no X-ray results; samples appear appear same as Runs 2-1, 2-2 | $MoSi_2$ likely went through a structure change, large amount of SiC indicates silicon nitride decomposition. |
| 3-2 | 80/20; 16% loss | | |
| 4-1 | 100/0; 8% gain | 4-1: $Mo_5Si_3$ + β-$Si_3N_4$ | Molydisilicide and alpha-silicon nitride go through structure change. |
| 4-2 | 80/20; 8% gain | | |
| 5-1 | 100/0; none | 5-2: 100% $MoSi_2$; SiC precipitate | $MoSi_2$ transformation appears affected by argon (rather than nitrogen) atmosphere. |
| 5-2 | 80/20; 8% loss | | |
| 5-3 | 70/30; 13% loss | | |
| 6-1 | 100/0; none | 6-2, 6-3: 100% $MoSi_2$ | Although greater weight losses than in Runs 1-5, essentially same results. |
| 6-2 | 80/20; 18% loss | | |
| 6-3 | 70/30; 17% loss | | |
| 7-1 | 80/20; 7% gain | 7-1: tetragonal $Mo_5Si_3$; large amount β-$Si_3N_4$ | Both $MoSi_2$ and α-$Si_3N_4$ structure changes: $MoSi_2 \to Mo_5Si_3$ + 7Si; 7Si + $xN_2 \to$ β-$Si_3N_4$ |
| 7-2 | 100/0; 7% gain | | |
| 8-2 | 80/20; 2% loss; 100/0; less than 5% | 8-1: $MoSi_2$ and hexagonal $Mo_5Si_3$ coexist | Thermodynamic coexistance of β-$Si_3N_4$ and $Mo_5Si_3$; minimal weight loss for all samples; hexagonal $Mo_3Si_3$ appears in equilibrium w/$MoSi_2$. |
| 8-3 | 70/30; less than 5% | | |
| 8-4 | 90/10; less than 5% | | |
| 9-1 | 80/20; 13% loss | 9-1: $MoSi_2$ | All $Si_3N_4$, some $MoSi_2$ lost. 20-80 composition transforms to β-$Si_3N_4$ and $Mo_5Si_3$; weight loss and gains appeared to vary linearly with $Si_3N_4$ content. Sintered α-$Si_3N_4$ is produced with reaction mix. |
| 9-2 | 100/0; 3% loss | | |
| 10-1 | 80/20; about 13% loss | 10-2: $MoSi_2$ | |
| 10-2 | 20/80; about 35% gain | 10-3: β-$Si_3N_4$ and $Mo_5Si_3$ | |
| 10-3 | | | |
| 10-4 | | | |
| 10-5 | | | |
| 10-6 | | | |
| 11-1 | 100/0; 5% loss | 11-3: $MoSi_2$ | |
| 11-2 | 90/10; 11% loss | 11-4: tetragonal $Mo_5Si_3$ and β-$Si_3N_4$; rxn: α-$Si_3N_4$, | |
| 11-3 | 80/20; 18% loss | | |
| 11-4 | | | |
| 11-5 | | | |
| 12-1 | all gained about .1 g | 12-2: tetragonal $Mo_5Si_3$, and large amount β-$Si_3N_4$ | Transformation to β-$Si_3N_4$ occurred at below 1500° C.; |
| 12-2 | | | |
| 12-3 | | | |
| 13-1 | gains of 0.06 to 0.07% | 13-2: tetragonal $Mo_5Si_3$, and large amount β-$Si_3N_4$ | $MoSi_2$ to $Mo_5Si_3$ then back to $MoSi_2$ above 1600° C. |
| 13-2 | | | |
| 14-1 | 100/0; 10% gain | 14-3 and 14-4: tetragonal $Mo_5Si_3$ and large amount β-$Si_3N_4$ | Inconclusive, since the 1000 sample also gained mass, need to sinter in 100% $Si_2N_4$ or no bed for analysis. |
| 14-2 | 80/20; 2% gain | | |
| 14-3 | 80/20 + $SiO_2$; 7% gain | | |
| 14-4 | | | |
| 15-1 | 80/20; 5% loss | 15-2: only $MoSi_2$, although low weight losses | Samples picked up $MoSi_2$ from embedding powder. SiO gas caused large weight losses that included $Si_3N_4$ and $MoSi_2$. All $SiO_2$ additive dissociated as in Run 16. |
| 15-2 | 80/20 + $SiO_2$; 10% loss | | |
| 16-1 | 80/20; 14% loss | 16-2: $MoSi_2$ and SiC precipitate | |
| 16-2 | 80/20 + $SiO_2$; 19% loss | | |
| 17-1 | 80/20; 8.4% loss | 17-2: $MoSi_2$ and SiC precipitate | |
| 17-2 | 80/20 + $SiO_2$; 13.8% loss | | |
| 18-1 | See Results in Table 2. | | |
| 18-2 | | | |
| 18-3 | | | |
| 18-4 | | | |
| 19-1 | 100/0; <1% loss | 19-1, 19-2, 19-3, 19-5: $MoSi_2$ | Alumina additive seemed to have precipitated to the surface as mullite. No clear evidence of $Si_3N_4$. Large weight losses in 80/20 and 80/20 with $Al_2O_3$ may include $MoSi_2$ as well. $MoSi_2$/SiC bed clearly enhances sinterability of 80/20 + additive although not enough $Si_3N_4$. All samples were extremely brittle. $Mo_5Si_3$ coated MoSi2 appears to be the result. |
| 19-2 | 80/20; 9% loss | 19-4: $MoSi_2$ and SiC precipitate | |
| 19-3 | 80/20 + $Al_2O_3$; 8% loss | | |
| 19-4 | 80/20 + C; 10% loss | | |
| 19-5 | 100/0 + C; 2.7% loss | | |
| 20-1 | 100/0 + C; <1% loss | 20-1, 20-2, 20-3, 20-5: $MoSi_2$ | |
| 20-2 | 80/20; >16% loss | 20-4: $MoSi_2$ and SiC precipitate | |
| 20-3 | 80/20 + C; 13% loss | | |
| 20-4 | 80/20 + $Al_2O_3$; >17% loss | | |
| 20-5 | 100/0 + C; 3% loss | | |
| 21-1 | 100/0; 10% loss | | |
| 21-2 | 80/20; 13% loss | | |
| 21-3 | 80/20 + C; 12% loss | | |
| 21-4 | 80/20 + $AlO_3$; 14% loss | | |
| 21-5 | 80/20 + Al; 11% loss | | |
| 22-1 | 100/0; 2% loss | 80/20 + Al sample appears as eutectoid structure of $MoSi_2$ particles W/in $MoSi_2$ β'/SiAlON lamella/matrix | Aluminum additive sample shows best success. Possible to constrain transformation to $Mo_5Si_3$ by carbon reacting with excess $SiO_2$ |
| 22-2 | 80/20; 9% loss | | |
| 22-3 | 80/20 + C; 5% loss | | |
| 22-4 | 80/20 + $Al_2O_3$; 16% loss | | |
| 22-5 | 80/20 + Al; 2.6% loss | 80/20 + C: $MoSi_2$, SiC, and β-$Si_3N_4$ | |

While the compositions, processes and articles of manufacture of this invention have been described in detail for the purpose of illustration, the inventive compositions, processes and articles are not to be construed as limited thereby. This patent is intended to cover all changes and modifications within the spirit and scope thereof.

INDUSTRIAL APPLICABILITY

The eutectoid composites of this invention would be useful for structural components or heating elements because of high temperature resistance, high temperature electrical and thermal conductivity, and oxidation resistance properties. Electromachining of the invention material is greatly facilitated by the electrical conductivity.

What is claimed is:

1. A composition comprising from about 55 weight percent to about 95 weight percent molybdenum disilicide, based upon total weight of the composition and from about 5 weight percent to about 45 weight percent $\beta'\text{-Si}_{6-z}\text{Al}_z\text{O}_z\text{N}_{8-z}$, wherein z=a number from greater than 0 to about 5.

2. A composition comprising from about 65 weight percent to about 90 weight percent molybdenum disilicide, based upon total weight of the composition and from about 10 weight percent to about 35 weight percent $\beta'\text{-Si}_{6-z}\text{Al}_z\text{O}_z\text{N}_{8-z}$, wherein z=a number from greater than 0 to about 5.

3. A composition comprising from about 75 weight percent to about 85 weight percent molybdenum disilicide, based upon total weight of the composition and from about 15 weight percent to about 25 weight percent $\beta'\text{-Si}_{6-z}\text{Al}_z\text{O}_z\text{N}_{8-z}$, wherein z=a number from greater than 0 to about 5.

4. A composition as recited in claim 3 wherein said $\beta'\text{-Si}_{6-z}\text{Al}_z\text{O}_z\text{N}_{8-z}$ is a single phase in a matrix of said molybdenum disilicide.

* * * * *